April 14, 1942.   M. J. N. DE MARGITTA   2,279,880
PHOTOFLASH LAMP
Filed Jan. 26, 1940
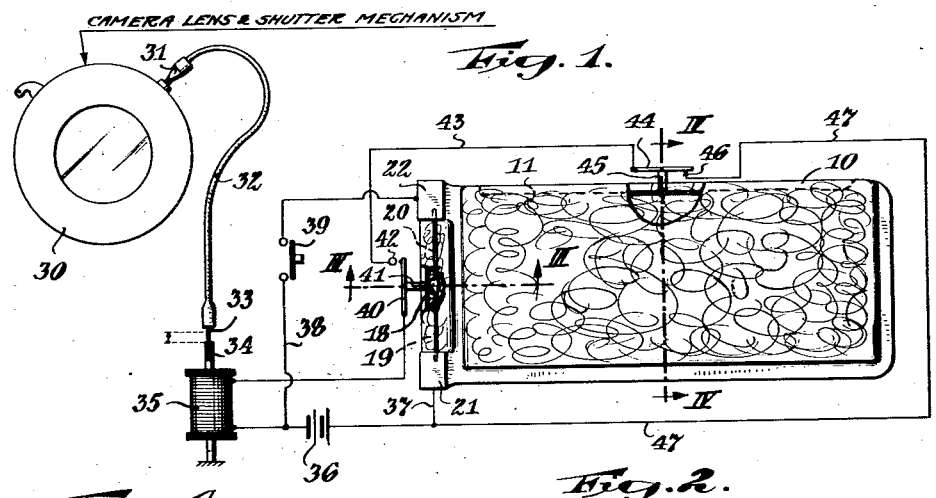
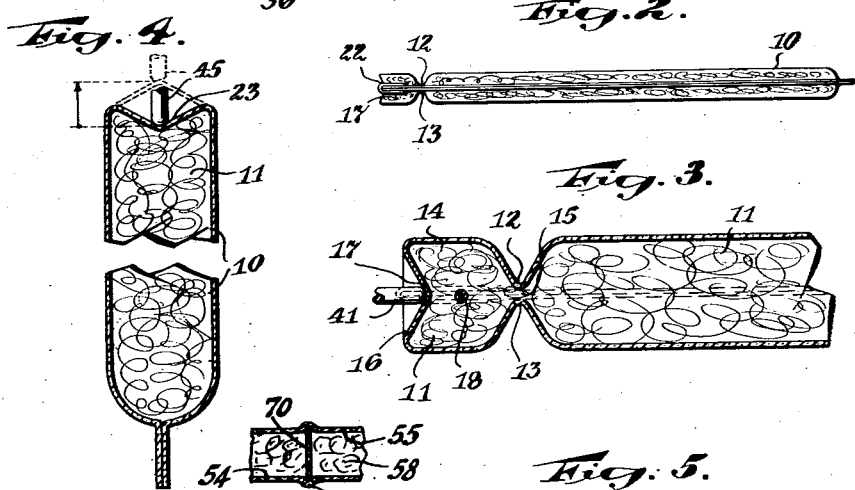
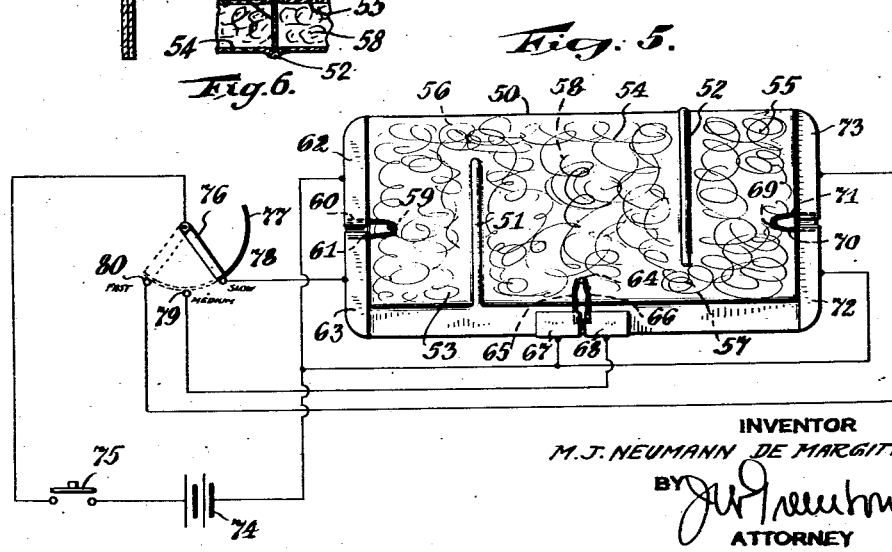
INVENTOR
M. J. NEUMANN DE MARGITTA.
BY
ATTORNEY Patented Apr. 14, 1942

2,279,880

UNITED STATES PATENT OFFICE 2,279,880

PHOTOFLASH LAMP

Michael J. Neumann de Margitta, New York, N. Y., assignor to Westinghouse Electric & Manufacturing Company, East Pittsburgh, Pa., a corporation of Pennsylvania Application January 26, 1940, Serial No. 315,743

4 Claims. (Cl. 67—29)

This application is a continuation in part of my prior applications for improvements in flashlamps, Serial No. 298,276, filed Oct. 6, 1939, and Serial No. 302,023, filed Oct. 30, 1939.

The invention relates to photoflash lamps and especially to flashlamps having partitioned sections.

An object of the invention is to provide a flashlamp capable of operating a camera shutter.

Another object of the invention is to provide a flashlamp which is capable of variable duration and intensity of flash.

Other objects and advantages of the invention will be apparent from the following description and drawing, in which:

Fig. 1 is a view partly perspective and partly diagrammatic of a flashlamp, circuit, and apparatus for actuating a camera shutter.

Fig. 2 is a bottom view of the flashlamp of Fig. 1.

Fig. 3 is an enlarged cross-sectional view on line III—III of Fig. 1.

Fig. 4 is a cross-section on lines IV—IV of Fig. 1.

Fig. 5 is a view partly in elevation and partly diagrammatic of a flashlamp and circuit arrangement for various slow, medium and fast ignition times of the flashlamp.

Fig. 6 is a view on lines VI—VI of Fig. 5.

As described in my co-pending applications Serial No. 298,276, filed Oct. 6, 1939, and Serial No. 302,023, filed Oct. 30, 1939, I construct a flashlamp from a plastic material, preferably cellulose acetate, although I may also use the transparent or translucent plastics of casein, pyroxylin, shellac or rubber. This plastic casing of the flashlamp can be very thin, even of the order of .005 to .02 inch in thickness. The thinness of the plastic casing makes it flexible under the pressure caused by the ignited combustible material in the presence of a combustion-supporting gas. This expansion of the casing occurs when the flashlamp is flashed, although the casing may collapse again when the oxygen is consumed. The present application utilizes the property of this expanding casing in connection with a partitioned photoflash lamp.

In one particular application of this partitioned flashlamp, I contemplate utilizing a portion of the flashlamp for the purpose of opening the camera shutter and then utilizing one or more portions of the flashlamp for the purpose of illuminating the object to be photographed and for closing the camera shutter. All these steps are performed automatically after the lamp is ignited.

In Fig. 1, I have disclosed a preferred embodiment of my flashlamp comprising a container 10 of thin flexible cellulose acetate, although other plastics may be utilized. This cellulose acetate is tough and does not need a special protective casing to prevent puncture of the container since the cellulose acetate can withstand careless handling and yet remain gas-tight. This lamp 10 is most conveniently formed into the thin oblong shape disclosed in the drawing.

The interior is filled with a combustible metal 11, such as a film or fine wires of aluminum or magnesium. A combustion-supporting gas, such as oxygen, also fills the container, preferably at atmospheric pressure, although this gas may be below or above atmospheric pressure.

The flashlamp at one end is partitioned off by indentations 12 and 13, extending across the casing. In the preferred embodiment these partitions do not completely shut off a preferably small compartment 14 from the main body of the flashlamp, inasmuch as a small space 15 is left for the propagation of combustion of the ignited material 11 in compartment 14 to the combustible material in the main body of the casing. The size of this small space 15 connecting the two compartments of the flashlamp may be decreased or enlarged accordingly as a slower or more rapid propagation of combustion from one compartment to the other is desired.

The casing wall 16 is indented as at 17. Just inside this indented casing is an igniting device 18 composed of a filament coated with zirconium, aluminum or phosphorous powder. The igniting device can have extended conductors 19 and 20 extending transversely to make contact conveniently with two metal clips 21 and 22 fastened to opposite ends of this edge 16.

A portion of the main casing also has an indentation similar to the indentation 17 previously described. While other parts of the casing may be selected, I have illustrated an indentation 23 at the central top portion of the main casing 10 as illustrated in Fig. 4.

The camera lens and shutter mechanism 30 is too well known to need description. The shutter mechanism with its flexible shaft 32 and an actuating plunger 33 is also well known standard equipment. This plunger 33 is connected in my preferred embodiment to a movable armature 34 of a solenoid 35. This solenoid is connected to a battery 36 which also has connections 37 and 38 through a switch 39 to the contacts 21 and 22 connected to the conductors 19 and 20 of the igniting device 18.

The solenoid 35 is connected to a pivoted contact arm 40 having a projecting arm 41 more specifically illustrated in Fig. 3, bearing against the indentation 17 in the side wall of the small compartment 14 of the flashlamp. A contact point 42 is placed a slight distance from this contact arm 40 and has a connection 43 to a contact arm 44 that in turn has a depending arm 45 resting in the indented top portion 23 of the main portion of the flashlamp. This contact arm 44, when the arm 45 is in the depression 23, makes connection having a contact point 46 with a connection 47 extending to the battery 36.

It will be noted that the contact between the arm 40 and point 42 is normally open and the contact between arm 44 and point 46 is normally closed.

The automatic operation of the device in the circuit disclosed depends upon what I have discovered to be a slight time lag in the ignition of the small partitioned off compartment 14 of the flashlamp and the ignition of the main body of the flashlamp therefrom, together with the expansible properties of the casing under the combustion of the enclosed material.

When the picture is ready to be taken, the switch 39 is closed. This switch flashes the igniting means 18 and the combustible material inside the small compartment 14. The pressure exerted on the casing will expand the indented portion 17 to push outward on the arm 41 and throw the contact arm 40 in contact with the contact point 42. This connection actuates the solenoid 35 to push up on the actuating wire 33 and open the shutter of the camera lens 30. The combustion of the material within the compartment 14 then passes through the small constriction 15 and flashes the combustible material 11 in the main section of the flashlamp. At the height of intensity of light created by the flashing of the main body of the flashlamp, the pressure will also reach a maximum inside of the casing, and this pressure will push out the indentation 23 in the top part of the casing to push on the arm 45 and raise the lever 44 out of contact with the point 46. This breaking of the contact at the height of the flash will break the electrical contact to the solenoid 35, whereupon the plunger 34 will fall because of gravity or because of the force of a spring or other means against which the solenoid has actuated, and the shutter will close through the pull on the actuating wire 33. The camera shutter has accordingly been opened immediately before the maximum intensity of the flash of the flashlamp and has been closed immediately upon the flashlamp's having reached its maximum of intensity. Various other types of connections, switches and actuating means can, of course, be utilized in place of some or all or in addition to those disclosed in the drawing.

A partitioned or sectionalized flashlamp has other advantages also. In Fig. 5 I have illustrated a conveniently formed flashlamp composed preferably of folded-over plastic casing 50, having two interior partitions 51 and 52, extending from opposite edges to divide the flashlamp into three compartments 53, 54 and 55 interconnected by small passageways 56 and 57. These partitions may be similar to 12 and 13 in Fig. 3 but the intervening space 15 may be eliminated. Mica or other insulation spacers 70 might be used pinched by the wall of the casing as illustrated in Fig. 6. These compartments are, of course, filled with the combustible material 58 previously described and a combustion supporting gas such as oxygen also is present in the container.

An igniting device is preferably present in each of the three compartments. In compartment 53 the igniting device 59 has its two connections 60 and 61 extending to the adjoining edge of the lamp where they are clamped between the metal clamps 62 and 63, which serve the double purpose of providing contacts and sealing the side of the casing. The igniting device 64 likewise has its connections 65 and 66 between two metal clamps 67 and 68 on the bottom edge of the casing. The igniting device 69 in section 55 has its connections 70 and 71 extending to the adjoining edge of the lamp where they are clamped between two metal clamps 72 and 73. The igniting devices are preferably arranged in combination with the partitions so that a straight line may not be drawn through any igniting device and the three compartments without intersecting a partition. This arrangement will prevent one device from simultaneously flashing all compartments. The battery 74 has one of its poles connected to one each of the pairs of exterior contacts to the igniting devices of the three compartments, such as the exterior contacts 62, 67 and 72. The other pole of the battery 74 is connected through a switch 75 to a movable contact arm 76 having an arcuate contact bar 77 capable of making one, two or three contacts on its periphery.

The first contact 78 in the path of movement of this movable bar 77 is connected with the exterior contact 63 to the igniting means 59 of the compartment 53. The second contact 79 in the path of the movable bar 77 is to the exterior contact 68 of the igniting means 64 in the middle compartment 54. The third contact 80 in the path of the movable bar 77 is connected to the exterior contact 73 of the igniting means 69 in the third compartment 55.

With the connection of the bar 77 to the contact arm 78 as disclosed in full lines in the Fig. 5, when the switch 75 is closed, the igniting means 59 only will be actuated by this electrical contact. This igniting means 59 will flash the combustible material in the compartment 53 and then this flashing material will flash in turn the combustible material 54 when it works through the restricted connection 56. The combustion will then work through the constriction 57 to flash the remaining compartment 55. There will accordingly be a continuous progress of the flashing of the material from the first compartment through the second and into the third. The flashing will accordingly be slow but prolonged due to the meandering path through the various compartments. The connection 78 can accordingly be labelled "slow" to indicate the longer time consumed in flashing the lamp.

If the contact arm 76 and its bar 77 are moved to make contact with all the points 78, 79 and 80, as indicated in dotted lines, then upon the closing of the switch 75, all of the igniting means 59, 64 and 69 in the three compartments will be actuated at once and the whole casing of the flashlamp will be immediately flashed. The result will be a continuous, very fast, but short flashing of the photolamp. This position of the bar 77 in contact with the point 80 and the points 78 and 79 can be labelled "Fast."

If the contact arm is moved so that the bar 77 has contact only with 78 and 79, then only two of the igniting means 59 and 64 will be energized and the compartment 55 will be flashed when the combustion works through the restricted passageway 57 from the compartment 54. This flashing will not be as fast as when all the igniting means were energized, but it will be faster than when only the one igniting means 59 is actuated. This connecting point 79 can accordingly be labelled "Medium."

The number of compartments, the size, nature of the partitions and the number of igniting means, etc., can be varied as desired.

I have accordingly disclosed particularly advantageous uses of the photoflash lamp with partitioned sections therein. Many other uses may also be possible with the sectionalized flashlamp. Various modifications may obviously be made in the particular form of the flashlamp and also in the connections made thereto. Accordingly, I desire only such limitations to be imposed upon my invention as are necessitated by the spirit and scope of the following claims.

I claim:

1. A flashlamp comprising an exterior casing from the group of plastics of cellulose acetate, casein, pyroxylin, shellac and rubber, combustible material in said casing, and a pair of partitions of which each partition is attached to one casing wall opposite from another wall to which the other partition is attached and leaves a gap between itself and the said opposite wall thereby dividing said casing into a plurality of intercommunicating compartments, each compartment having combustible material therein.

2. A flashlamp comprising an exterior casing of expansible plastic material, means partitioning said casing into compartments, combustible material in each of the compartments, and means for igniting the combustible material in one compartment before that in another compartment whereby the portion of the expansible casing about said compartment expands before another portion, and a switch having operative contact with said first mentioned portion whereby said switch is actuated in response to said expansion.

3. A flashlamp comprising a casing having expansible and intercommunicating compartments, combustible material therein, and means for igniting the combustible material in one compartment before that in another compartment whereby one compartment expands before another compartment, and means connected to the first mentioned expanding compartment of the casing for opening a camera shutter.

4. A flashlamp comprising a flexible casing having expansible and intercommunicating compartments, combustible material therein, and means for igniting the combustible material of one compartment before that of the other compartment, whereby one portion of the flexible casing expands before another portion, and means responsive to the expansion of the first mentioned compartment for opening a camera shutter, and means responsive to the expansion of the other mentioned compartment for closing the camera shutter.

MICHAEL J. NEUMANN DE MARGITTA.